United States Patent
Taylor et al.

(10) Patent No.: US 11,921,740 B2
(45) Date of Patent: Mar. 5, 2024

(54) METHOD OF FACILITATING CONTACT BETWEEN MUTUALLY INTERESTED PEOPLE

(71) Applicant: VERENT LLC, Rock Springs, WY (US)

(72) Inventors: Gregory Taylor, Huntington Beach, CA (US); Douglas Morgen, Huntington Beach, CA (US)

(73) Assignee: VERENT LLC, Rock Springs, WY (US)

( * ) Notice: Subject to any disclaimer, the term of this patent is extended or adjusted under 35 U.S.C. 154(b) by 0 days.

(21) Appl. No.: 17/467,311

(22) Filed: Sep. 6, 2021

(65) Prior Publication Data
US 2021/0397629 A1      Dec. 23, 2021

Related U.S. Application Data

(60) Division of application No. 17/225,214, filed on Apr. 8, 2021, now Pat. No. 11,163,789, which is a
(Continued)

(51) Int. Cl.
*G06F 16/25* (2019.01)
*G06F 16/2457* (2019.01)
(Continued)

(52) U.S. Cl.
CPC ...... *G06F 16/258* (2019.01); *G06F 16/24575* (2019.01); *G06Q 30/02* (2013.01);
(Continued)

(58) Field of Classification Search
CPC . G06F 16/258; G06F 16/24575; G06Q 30/02; H04L 51/04; H04L 51/32; H04L 67/22
(Continued)

(56) References Cited

U.S. PATENT DOCUMENTS 5,086,394 A * 2/1992 Shapira .................. G01S 13/74
340/407.2
5,950,200 A * 9/1999 Sudai ................ H04M 3/42008
(Continued)

*Primary Examiner* — Shahid A Alam
(74) *Attorney, Agent, or Firm* — FRESH IP PLC; Clifford D. Hyra; Aubrey Y. Chen

(57) ABSTRACT

A computer-readable non-transitory physical storage medium having stored thereon machine-executable code for electronically facilitating contact between mutually interested entities, said machine-executable code to be executed by a microprocessor, said machine executable code which when executed by said microprocessor causes the microprocessor to perform operations including suggesting to a first user other users that first user may be interested in, where the suggested other users are filtered based on their location, causing a device to display a graphical user interface (GUI) for the first user to input a rating of the first user's level of interest in one or more respects in at least one other user, accepting the first user's level of interest rating via the GUI while not displaying the first user's rating to the at least one other user, and electronically notifying a pair of users that have rated each other above a threshold level.

13 Claims, 1 Drawing Sheet

Related U.S. Application Data continuation of application No. 15/917,515, filed on Mar. 9, 2018, now Pat. No. 10,977,270, which is a continuation of application No. 14/589,995, filed on Jan. 5, 2015, now Pat. No. 9,934,297, which is a continuation of application No. 12/000,596, filed on Dec. 14, 2007, now Pat. No. 8,935,296.

(60) Provisional application No. 60/874,701, filed on Dec. 14, 2006.

(51) Int. Cl.
    *G06Q 30/02*     (2023.01)
    *H04L 51/04*     (2022.01)
    *H04L 51/52*     (2022.01)
    *H04L 67/50*     (2022.01)

(52) U.S. Cl.
    CPC .............. *H04L 51/04* (2013.01); *H04L 51/52* (2022.05); *H04L 67/535* (2022.05)

(58) Field of Classification Search
    USPC .......................................... 709/204; 707/769
    See application file for complete search history.

(56) References Cited

U.S. PATENT DOCUMENTS

| | | | | |
|---|---|---|---|---|
| 5,963,951 | A * | 10/1999 | Collins | G06Q 10/10 |
| 6,683,820 | B1 * | 1/2004 | Struzinski | G01S 15/66 |
| | | | | 367/124 |
| 7,069,308 | B2 * | 6/2006 | Abrams | H04L 67/306 |
| | | | | 707/999.005 |
| 2002/0026351 | A1 * | 2/2002 | Coleman | G06Q 30/0239 |
| | | | | 705/14.19 |
| 2002/0070954 | A1 * | 6/2002 | Lang | G06Q 30/02 |
| | | | | 715/700 |
| 2002/0091556 | A1 * | 7/2002 | Fiala | G06Q 10/025 |
| | | | | 705/6 |
| 2004/0001087 | A1 * | 1/2004 | Warmus | H04H 60/65 |
| | | | | 715/745 |
| 2005/0171832 | A1 * | 8/2005 | Hull | G06Q 30/0201 |
| | | | | 705/7.29 |
| 2006/0262055 | A1 * | 11/2006 | Takahara | H01L 27/14678 |
| | | | | 345/81 |
| 2007/0244987 | A1 * | 10/2007 | Pedersen | H04L 67/06 |
| | | | | 709/217 |
| 2011/0078585 | A1 * | 3/2011 | King | G06F 16/332 |
| | | | | 715/751 |

* cited by examiner

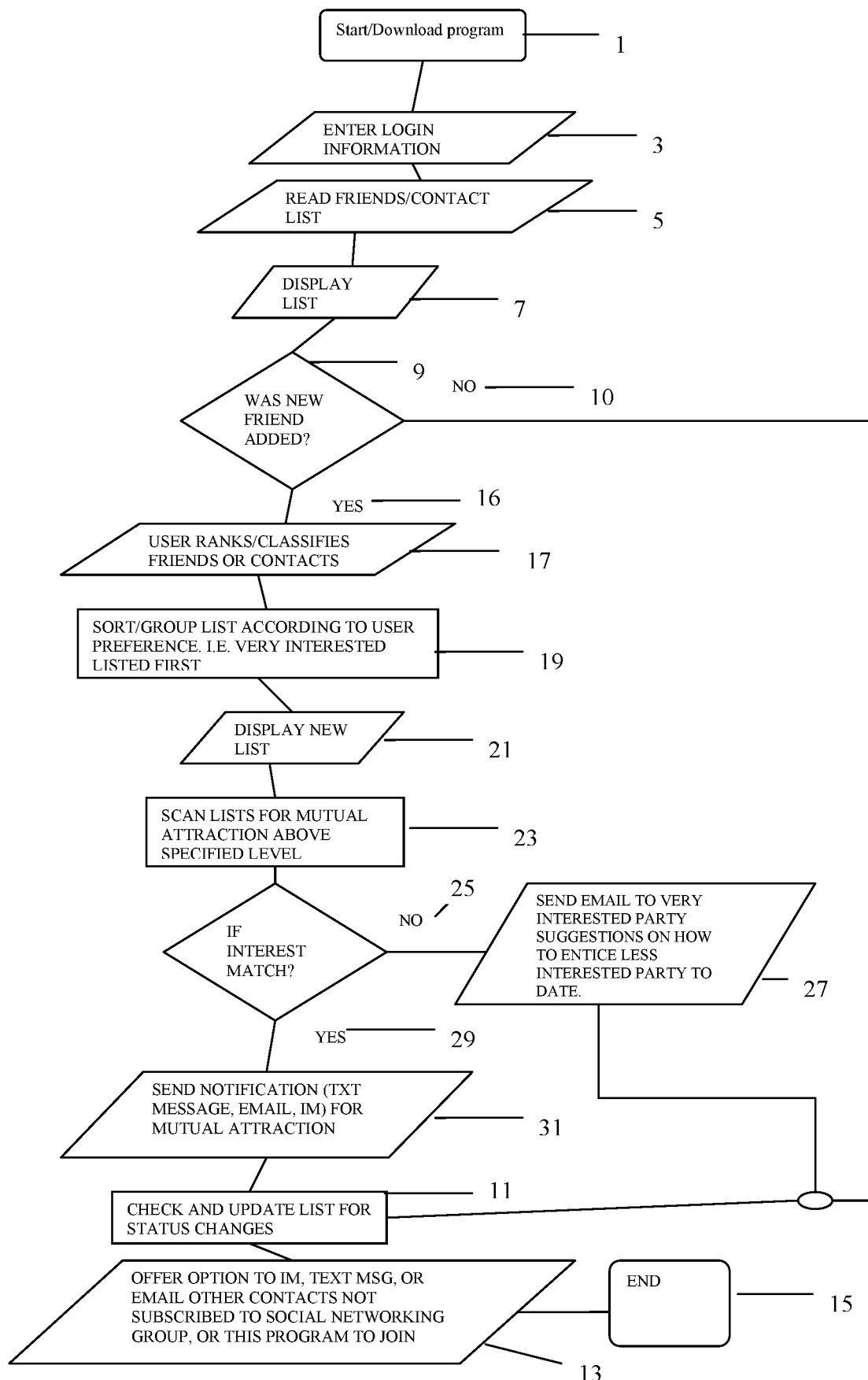

METHOD OF FACILITATING CONTACT BETWEEN MUTUALLY INTERESTED PEOPLE

This application is a Divisional of U.S. application Ser. No. 17/225,214 filed Apr. 8, 2021, which is a continuation of U.S. application Ser. No. 15/917,515 filed Mar. 9, 2018, now U.S. Pat. No. 10,977,270, which is a continuation of U.S. application Ser. No. 14/589,995 filed Jan. 5, 2015, now U.S. Pat. No. 9,934,297, which is a continuation of U.S. application Ser. No. 12/000,596, filed Dec. 14, 2007, now U.S. Pat. No. 8,935,296, which claims priority to U.S. Provisional Application No. 60/874,701 filed Dec. 14, 2006, all of which are hereby incorporated by reference in their entirety.

To the extent any amendments, characterizations, or other assertions previously made in any related patent applications or patents, including any parent, sibling, or child, with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

TECHNICAL FIELD OF THE INVENTION

The present invention relates to the field of computer software, particularly online dating and social networking sites.

BACKGROUND OF THE INVENTION

The birth of the internet has revolutionized all manner of human communications. One form of human interaction that has adapted successfully to the internet is dating. Numerous websites have sprung up to support the interest in online dating services. Relationships are frequently forged in online chats and on message boards. Meeting potential mates over the internet offers the advantage of convenience and selection. Yet many of the problems that make it difficult to meet a romantic partner in traditional settings remain in online dating services.

One major obstacle to identifying potential romantic partners is fear of rejection. In a traditional setting or in an online dating service, one person has to make the first move. That person is opening themselves up to rejection by the party to whom advances are made. On an online dating service such as Match.com, or U.S. Pat. No. 5,963,951, that risk is alleviated by the relative anonymity of members and the fact that they interact from a distance. Nevertheless, this fear remains a factor both in preventing members from contacting one another and in preventing people from joining the site in the first place. For this reason, Match.com introduced a new "wink" option on its website. The "wink" allows members to indicate interest in another member without sending a personal message. Because interaction between the parties is limited, rejection is less of an issue. Nevertheless, this innovation does not solve the problem. "Wink"ing is still a unilateral advance and cannot determine a mutual interest.

Other websites have been created in an attempt to solve this problem. Sites such as secretadmirer.com, ecrush.com, and crushdate.com offer a service whereby members can determine whether their love interests share an attraction for them. After signing up, the member inputs the email addresses of his romantic interests. These people receive emails from the site informing them that someone is interested in them and asking them to become site members themselves. When they sign up, the new members enter the email addresses of their romantic interests. Whenever two people list each other as romantic interests, the site sends an email to both parties letting them know of the mutual attraction.

These websites do not effectively deal with the problem of shyness and fear of rejection. Users must take affirmative action and sign up at the site and the people they email must do so as well. More than likely the people who receive emails will believe they are spam and simply delete them. The member who caused the emails to be sent will never know whether those people are not interested in him or whether they simply deleted the email. Furthermore, it requires a person to know the email address of the person they are interested in. The method is also unlikely to result in matches between people with moderate interest in each other. People will not go to the effort of finding and entering the email address of everyone they are even somewhat attracted to. At most, they will enter the addresses of those they have a very strong interest in.

Another attempt at solving this problem can be found in Sutcliffe et al (U.S. Pat. No. 6,249,282). In Sutcliffe, a user enters a number of characteristic and criteria data describing his or herself and the kind of people he or she is interested in dating, respectively, into a common database. The Sutcliffe program then searches through the database to find users whose characteristic data satisfy the user's criteria data and whose criteria data is satisfied by the user's characteristic data. When it finds a match, the program notifies the user and provides contact information for the matches.

A similar method is used with a paging device in Shapira (U.S. Pat. No. 5,086,394). In Shapira, personal data such as traits and interests are entered into a device at a central location. The device searches for matching entries satisfying geographic and time constraints and pages users when a match is found. Fraccaroli (U.S. Pat. No. 6,549,768) does essentially the same thing but for cell phone users.

Sutcliffe, Shapiro, and Fraccaroli are imperfect solutions. They really only automate to some extent the process of finding potential romantic partners who are compatible. One user still must approach the other, and may still be rejected. Any set of data input is insufficient to encompass the many poorly understood factors that go into a mutual attraction or lack thereof. Additionally, the members are still strangers and cannot rely on the information provided by the other party. Many shy people will still be unwilling to join such a site or service.

Another attempt at resolving this difficulty is Sudai et al (U.S. Pat. No. 5,950,200). The Sudai method is much like that of the secretadmirer.com type of websites. Users input the identities of persons who they are attracted to or who share mutual interests. The inputs are stored in a database and searched repeatedly for matches, that is, for two people who feel the same way about each other. When a match is found, both users will be notified unless both agree that one of the parties should initiate (they have input this preference previously), in which case that party is informed before the other. This system suffers from the major flaw that both users must be members of this service. Like the secretadmirer.com websites, it will also result in few matches between people with only moderate attraction for one another because it requires each user to manually enter the names of people they are interested in.

Another obstacle that online dating sites do not resolve is the limited amount of information available about a potential date. Because the members are generally strangers, they have no way to verify the truthfulness of the other party's statements about themselves. This is an enormous problem in online dating. Many members are married but pass themselves off as single or portray themselves in a much more desirable light than is warranted. When the members meet in real life, they may be very disappointed by what they see, or may not learn of the other party's deception until well into the relationship, leading to heartbreak and pain. Members may even be subjected to physical violence when they meet for the first time.

One way to deal with this obstacle is to meet people that you already know or who know people who you also know. You then have a basis for determining the truthfulness of those peoples' representations of themselves. One efficient way of finding and communicating with people who share contacts with you is through a social networking site such as Friendster (Friendster.com, U.S. Pat. Nos. 7,069,308 and 7,117,254 B2). These sites allow you to know and view information about the friends and other contacts of your friends and contacts.

The sites thus provide users with an efficient means of identifying people they may have an interest in and whose information they can verify. However, no system exists for the full exploitation of the social network phenomenon for facilitating the meeting of people with a mutual interest. These sites do not have a process by which members can indicate an interest in other members and be automatically contacted when the interest is mutual.

Lists of contacts are also often stored in "buddy lists" (See U.S. Pat. No. 6,366,962) in online messaging software or in cell phones. Although Fraccaroli uses cell phones to notify users of matches, it does not take advantage of the contact lists in users' cell phones.

Needs exist for improved methods of facilitating contact between mutually interested parties.

SUMMARY OF THE INVENTION

The present invention is software that enables users of communication technologies such as cell phones, instant messaging, and social networking engines to date romantically people on their contact lists without the risk of rejection.

The invention will preferably be integrated (or done via a separate website with "friends" imported into an account) with a social networking website such as Friendster, MySpace, or Facebook, an instant messaging software such as AOL Instant Messenger or MSN Messenger, and/or a cell phone. If a separate website is used, alone or in combination with the integrated software, that website can collect and compile a user's contacts from each of these technologies, allowing the user to set ratings and software options and preferences from a central location. The users will rate their friends, buddies, or contacts on a scale of 1-10, or not interested, possibly interested, or very interested or some other such rating scheme. The ratings will be blind and neither user will expressly know the ratings their friends give them.

Once each user rates a counterpart a certain level, say "interested" or 6+ then they will both get notified. In a preferred embodiment of the invention, the notification is effected by an email stating that there may be a match with that friend. The notification may also take the form of an instant message, cell phone text message, or other similar communication, and may be effected by a different means for each party. Ads may be sold in the notification suggesting possible date locations or events to go to. The notification also will provide context-specific relationship advice. This advice may vary depending on the relative ratings of each party for one another, and could include suggestions of how best to contact and establish a baseline relationship with the other user.

In another embodiment, users have the ability to set a preference for one party to initiate. If both parties agree, only the initiating party will be contacted when a match occurs. The other party will be notified some time later.

In an alternative embodiment, the invention, at the user's option, may suggest other users the first user might be interested in who the first user does not know based on comparison of the first user's ratings with other users'. In another embodiment, users may "matchmake," suggesting potential matches to other users they know.

The present invention may also be used outside of a dating context, for example in forming business or any other type of relationships. The rating system is simply modified to reflect the changed type of interest.

In a new method of facilitating contact between mutually interested entities, a graphical interface is provided for a user to rate its level of interest in one or more respects in at least one other user from a pre-existing list of contacts, the user's ratings are not displayed to other users, and a pair of users is notified when each user's rating for the other has exceeded a threshold level. The graphical interface provided may be a modification of an existing graphical interface of a social networking site, instant messaging software, cell phone, or PDA. The existing graphical interface may be an existing graphical interface of two or more social networking sites, instant messaging software, or cell phones, in which case lists of contacts from each are combined so that a user can rate contacts from at least two of the two or more social networking sites, instant messaging software, cell phones, or PDAs from a single graphical interface. User settings or preferences may be set and adjusted for all the modified graphical interfaces from a central location. User settings or preferences may be set and adjusted for all the modified graphical interfaces from any one of the modified graphical interfaces.

In one embodiment, the pre-existing list of contacts is from a social networking site, instant messaging software, cell phone, or PDA, and the graphical interface is provided on a separate website. The pair of users further may be notified by sending an email, instant message, or cell phone text message. A graphical interface may be provided to allow the user to set the way in which it is notified. When the pair of users is notified, the pair of users may be sent suggestions for date or meeting locations, events to go to, general relationship or dating advice, or context-specific relationship advice. The suggestions or advice may include advertisements. The context-specific advice may vary depending on the relative ratings of each of the pair of users for the other. The context-specific advice may include suggestions of how to best contact and establish a baseline relationship with the other of the pair of users.

A graphical interface may be provided for users to set a preference for one party to initiate and the notification of the pair of users may be modified based on the preference of the pair of users. The notification may be modified by notifying one user of the pair before the other when both prefer one party to initiate. At least one user of the pair may be notified of the preference for one party to initiate of the other.

Other users that a first user may be interested in may be suggested to a first user based on a comparison of the first user's ratings with other users'. The other users suggested may not be on the first user's pre-existing list of contacts. The other users suggested may be users rated highly by users other than the first user who rate the users on the first user's pre-existing list of contacts similarly to the first user. The suggesting may be done only when the user has opted to receive such suggestions.

A graphical interface may be provided to allow the user to match-make by suggesting potential matches to other users they know. The user may be allowed to choose not to receive suggested potential matches. The user may be allowed to choose whether to receive suggested potential matches depending on characteristics of the suggested potential match. One member of a suggested potential match may be notified if the other party has opted not to receive the suggested potential match. An option may be provided for the other party to allow the notifying one party of a suggested potential match to include informing the one party of the reason the other party has opted not to receive the suggested potential match.

In one embodiment, one of the one or more respects is a non-romantic respect. The graphical interface for a user to rate its level of interest in one or more respects in at least one other user may be provided in part by providing different access points and contact lists for the user to rate its level of interest in romantic and non-romantic respects. A single access point and contact list may be used for rating interest in romantic and non-romantic respects.

A graphical interface may be provided that allows a user to import contacts from an instant messaging software, social networking site, PDA, or cell phone, and a comprehensive list of contacts for the user to rate may be displayed.

When the graphical interface provided is a modification of an existing graphical interface of a social networking site, instant messaging software, cell phone, or PDA, a graphical interface may be provided that allows the user to invite contacts who are not yet users of the social networking site, instant messaging software, cell phone, or PDA with the modified graphical interface to join the social networking site, instant messaging software, cell phone, or PDA with the modified graphical interface. Rating information may be stored on a social networking site or in an instant messaging software or instant messaging software server. If the graphical interface provided is a modification of an existing graphical interface of a cell phone or PDA, the rating information may be stored on an online server.

As part of the notification of a pair of users when each user's rating for the other has exceeded a threshold level, each contact the user has rated above the threshold level may be checked to see if that contact has also rated the user above that threshold level whenever a user rates a new contact or changes an existing rating. To notify the pair of users, a single notification may be sent as soon as the pair's ratings exceed the threshold level, and another notification may not be sent unless the ratings change such that one of the pair's ratings does not exceed the threshold level, and subsequently the pair's ratings change again such that each rating exceeds the threshold level. An indicator may be provided to indicate for the user each contact on a pre-existing list of contacts for which that contact's rating of the user and the user's rating of that contact each exceed the threshold level.

A graphical interface may be provided that allows the user to set a number of preferences regarding how contact lists and ratings are displayed and accessed. In the embodiment where the existing graphical interface may be an existing graphical interface of two or more social networking sites, instant messaging software, or cell phones, a single graphical interface outside of the social networking sites, instant messaging software, cell phones, or PDAs with modified graphical interfaces may be provided that the user can use to rate contacts from at least two of the two or more social networking sites, instant messaging software, cell phones, or PDAs. The single graphical interface outside of the social networking sites, instant messaging software, cell phones, or PDAs with modified graphical interfaces may be a downloadable program or website. In that case, a central database of contact, rating, and preference information may be maintained with the downloadable program or website.

The graphical interface may be provided, the user's ratings not displayed to other users, and a pair of users notified using an existing website and software infrastructure, making additional storage or servers or maintenance of a separate website are not necessary. A graphical interface may be provided allowing the threshold level to be modified by the user. The threshold level may be allowed to be modified upwards but not downwards. A graphical interface may be provided allowing a desired threshold level to be set by the user and setting the threshold level to the highest desired threshold level of the pair of users.

An option may be provided to the user to receive relationship advice when the user rates another user highly but the other user does not rate the user above the threshold level, when the user rates another user more highly than the other user rates the user and the other user does rate the user above the threshold level, or whenever a pair of users including the user is notified. The user may be informed when another user who the user has rated does not have a rating for the user. An option may be provided to the user to allow another user to be informed when the user does not have a rating for the other user, and otherwise the other user is not informed.

The pre-existing list of contacts may be read, the list displayed, whether a new contact was added to the contact list is checked, if so a graphical notice provided for the user to rate the new contact, the list sorted according to rating, the sorted list displayed, the list scanned for ratings exceeding the threshold level, and whether contacts rated above the threshold level have rated the user above the threshold level is checked.

When the invention is integrated into a networking site, instant messaging software, or cell phone or PDA, the method makes use of the existing software of the networking site, instant messaging software, or cell phone or PDA. The method is implemented by programs using the existing software infrastructure, thus minimizing the programming expertise required for implementation and making the integration a relatively simple task. For example, Facebook has a public software platform for application development. The Appendix contains the source code for a simple example implementation of the method as a Facebook application making use of that software.

In any integration, implementation of the method typically requires new graphics for allowing the user to rate and view ratings for its contacts and procedures for storing and checking the rating information. Procedures for sending notifications and storing contact lists are typically existing features of whatever the method is being integrated into and can be easily adapted to the purpose of this method.

These and further and other objects and features of the invention are apparent in the disclosure, which includes the above and ongoing written specification, with the drawings.

BRIEF DESCRIPTION OF THE DRAWINGS

FIG. 1 is a diagram showing the operation of one embodiment of the invention.

DETAILED DESCRIPTION OF THE PREFERRED EMBODIMENTS

FIG. 1 is a diagram showing the operation of one embodiment of the invention. A user first initiates the program 1 and is prompted to enter his login information 3. The program automatically reads the user's friends/contact list(s) 5 and displays it 7. The program then checks to see if any new friends have been added to the list since the last time the program was run 9. If no friends have been added 10, the user can check and update the list for status or ranking changes 11. The program offers an option 13 to instant message, text message, or email other contacts not subscribed to a social networking group or to this program to join before the user terminates the program 15.

If a friend/contact has been added 16, the user can then rank or classify the new friends 17. The contact list is then sorted according to user preference 19 and the modified list is now displayed 21. The list is then scanned for mutual interest above a specified level 23. If no mutual interest is found 25, an email is sent to the more interested party giving advice on how to entice less interested parties to date 27. If a mutual interest is found 29, the program sends a notification of the match to the users 31. The user can then check and update the list for status or ranking changes 11 and the program offers an option 13 to instant message, text message, or email other contacts not subscribed to a social networking group or to this program to join before the user terminates the program 15.

In a preferred embodiment, the present invention is a program integrated into one or more social networking sites, instant messaging software, or cell phone/PDA software. Because of this, the user does not have to download or sign up for anything. Once the integration is complete and initiated every user of the site or software will immediately have the option of using the present invention.

When a user loads or logs into the site or software, they will find the display has changed slightly. Next to the name of each contact in their "friends list" or "buddy list" will be an icon the user can click on in order to rate or characterize that contact by the user's level of interest in that contact as a romantic partner.

Because social networking sites, instant messaging software, and cell phones are so popular and because the program will be displayed prominently, high levels of participation are expected. This aspect is critical. In order for any matching system based on mutual attraction to be effective in locating dates, many people who know each other must participate.

There will also be an option within the site or software for the user to import additional contacts from any other instant messaging software or social networking sites in which the user participates, or from the user's cell phone. The user can then view a comprehensive list of all of these contacts and rate them and set options for the program from this central location within the user's social networking site, instant messaging software, or cell phone. If the user is a member of more than one site or software into which the program is integrated, the user will be exposed to the program whenever the user uses either site or software. The user will be able to manage his contact list and program options from each point. An option within the program allows the user to invite contacts who are not yet a member of an integrated site or software to join.

Whenever a user rates or characterizes a new contact or changes an existing rating, the program checks each contact that the user has rated above a certain threshold interest level to see if that contact has also rated the user above that threshold level. Rating information is stored by the site or messaging software just like other information about the user, e.g. name, location, etc. However, rating information is not visible to other people who access the user's page on the social networking site or "profile" on a messaging site. Only someone who is logged in as the user can view the user's ratings. If the user is accessing the program from a cell phone, the ratings are stored not on the cell phone, but on a server online. This allows the program to compare the users' ratings for matches even when their phones are off or otherwise inaccessible.

Because the program checks for matches whenever a user makes a new rating or modifies an old one, a match will always be detected as soon as it occurs. The program then notifies the users that a match has occurred. This notification will be sent by email, instant message, or cell phone text message, according to the preference set by each user. The notification will inform each user that a match has occurred, but will not reveal the other user's actual rating. The notification will also contain advertisements suggesting date locations and events.

After a match has been initially detected and the parties notified, the program will not send another notification for the same match unless the match lapses (one user lowers their rating of the other below the threshold level) and then is reestablished. Optionally, an indicator, such as an icon of some kind, may be displayed on the list beside each user for which a match presently exists. The indicator helps to prevent a situation in which neither user received or viewed the notification for some reason and therefore is unaware that a match has occurred.

Within the program interface in the social networking site or software, there will be many preferences that can be set by the user. These preferences allow the user to customize how the contact lists and ratings are displayed and accessed, how notifications will be received, etc.

The user will also be able to access the user's combined contact list and ratings from outside any of the sites or software the program is integrated into. The user can instead access the program through a downloadable program or a website that is just for the program itself. In this way, users will be able to access the program even when logging into an integrated site or software is undesirable, for example for privacy reasons, or when an integrated site of software is experiencing technical difficulties. This aspect of the program also allows it to be used by people who are not members of the integrated sites or software, who may download or sign up for the program directly instead.

This downloadable program or website maintains a central database of the contact, rating, and preferences information. Having a centralized database of the information makes it easier to use with more than one site or software. Every time the user makes a change to the information from an integrated site or software, those changes are uploaded to the central database. Each site or software can check its data against the centralized database each time it loads, automatically making changes to its data that the user initiated from a different access point (site or software).

In an alternative embodiment, the program functions without the use of a centralized database and access point.

In this way, the program entirely piggybacks on existing site and software infrastructure. Additional storage and servers are not necessary, nor is maintenance of a separate website.

In another embodiment, the user has the option of modifying the threshold interest level above which matches are detected. The user may modify this level upwards, but not downwards. This prevents users from being flooded with notifications regarding low interest contacts.

In an alternative embodiment, the user has the option of setting an "initiation" preference. Some people believe that, for an inter-gender relationship, the male should always initiate contact. Users will therefore have the option of setting a preference for male initiation or female initiation. In one embodiment, the user who is preferred to initiate will receive notification some time period before the other user, allowing the first user to initiate contact. If the users have conflicting preferences, they are sent simultaneous notifications. In another embodiment, both users receive notification at the same time regardless, but are simply informed of the other user's preference in the notification.

In another embodiment, the invention dispenses dating advice under some circumstances. This feature is an option that the user can set a preference for or against. In one embodiment, dating advice is given within the notification whenever a user has rated the match higher than the match has rated the user. This advice may include ways to initiate contact, when to ask for a date, etc. In another embodiment, general dating advice and first date tips are given in every notification. In a third embodiment, advice is given when a user rates a contact highly and a match is not found. This advice may be given by email, instant message, or cell phone text message. This advice helps the user to create an interest in the user by the contact.

In an alternative embodiment, users are informed when a contact they have rated does not have a rating for them at all. This feature allows users to distinguish between a contact who is not interested in the user and a contact who simply does not use the rating system. In another embodiment, a user may set as a preference whether other users are informed when the user has not rated them at all.

In an alternative embodiment, the program is capable of suggesting possible romantic interests who are not in a user's contact list. The program compares a user's ranking of contacts with the rankings of other users of those same contacts. When a high correlation is found between the contacts indicated as high interest by the first user and by another user, contacts of that other user who are rated by the other user as high interest, but who are not on the first user's contact list, will be recommended to the first user as a person of potential interest. This recommendation can be made by email, instant message, or text message. In one embodiment, this feature is an option that can be turned on or off as one of the user's preferences.

In another embodiment, users can play matchmaker. One user can suggest two other users the first user knows as a possible match. The program will then send those users a notification as with a normal match, except that the notification will inform them that this match is based not on mutually indicated attraction, but on the suggestion of the matchmaking user. Users may opt out of this feature. Users may elect never to receive match notifications originating from matchmakers or may limit the receipt of such notifications based on characteristics of the proposed match. For example, users might elect not to receive notifications when the other user they are matched up with is not Jewish, is under a certain height, etc. This "filtering" option is limited only by the amount of user data stored by the site or software the program uses.

When one user does not receive a matchmaking notification and the other user does, that user will be informed that the other user elected not to receive the matchmaking notification, but will not give the reason why. The receiving user will not know whether the other user's filtering requirements were not met, or whether that user simply does not wish to receive matchmaking notifications at all. Alternatively, the user may elect to have the reason sent to the other user when a matchmaking notification is not received due to the user's preferences.

In an alternative embodiment, the program is used for non-romantic relationships, such as friendships or business associations. In one embodiment, the use of the program for non-romantic relationships is entirely separate from its use for romantic relationships, involving different access points and contact lists. In another embodiment, the program uses one access point and contact list for both romantic and non-romantic interests. Each contact simply has one rating for romantic interest and one or more for non-romantic interest, such as business interest or friendship interest. In either embodiment, this use of the program functions in the same way as the use of the program for romantic relationships, except that the rating is of a different kind of interest and the ads and type of advice that is given, if any, are adapted to the appropriate relationship.

While the invention has been described with reference to specific embodiments, modifications and variations of the invention may be constructed without departing from the scope of the invention.

We claim:

1. A computer-readable non-transitory physical storage medium having stored thereon machine-executable code for electronically facilitating contact between mutually interested entities, said machine-executable code to be executed by a microprocessor, said machine executable code which when executed by said microprocessor causes the microprocessor to perform operations comprising:
   suggesting to a first user other users that first user may be interested in, wherein the suggested other users are filtered based on each of the suggested other users' locations;
   causing a device to display a graphical user interface (GUI) for the first user to input a rating of the first user's level of interest in at least one other user;
   accepting the first user's level of interest rating via the GUI while not displaying the first user's rating to the at least one other user; and
   electronically notifying a pair of users that have rated each other above a threshold level.

2. The computer-readable non-transitory physical storage medium of claim 1, wherein causing the device to display the GUI for the first user to input a rating of the first user's level of interest in at least one other user comprises causing the first user's computing device to display images for interaction with the first user.

3. The computer-readable non-transitory physical storage medium of claim 2, wherein accepting the first user's level of interest rating via the GUI comprises receiving input ratings from the first user based on the first user's interaction with the displayed images.

4. The computer-readable non-transitory physical storage medium of claim 3, wherein the displayed images comprise one or more images of the at least one other user.

5. The computer-readable non-transitory physical storage medium of claim 2, wherein the displayed images comprise one or more images of the at least one other user.

6. The computer-readable non-transitory physical storage medium of claim 1, wherein causing the device to display the GUI for the first user to input a rating of the first user's level of interest in at least one other user comprises causing the first user's computing device to display one or more contacts to the first user, and wherein display of the one or more contacts is customized based on preferences of the first user.

7. The computer-readable non-transitory physical storage medium of claim 6, wherein the preferences of the first user on which customization of the display of the one or more contacts is based comprises gender.

8. The computer-readable non-transitory physical storage medium of claim 6, wherein the preferences of the first user on which customization of the display of the one or more contacts is based comprises sexual orientation.

9. The computer-readable non-transitory physical storage medium of claim 6, wherein the one or more contacts are one or more contacts of the first user.

10. The computer-readable non-transitory physical storage medium of claim 1, wherein the first user may elect to receive or to not receive notifications based on the filtering.

11. The computer-readable non-transitory physical storage medium of claim 1, wherein the operations further comprise:
displaying, via the GUI, images associated with a user that has rated the first user above the threshold level.

12. A computer-readable non-transitory physical storage medium having stored thereon machine-executable code for electronically facilitating contact between mutually interested entities, said machine-executable code to be executed by a microprocessor, said machine executable code which when executed by said microprocessor causes the microprocessor to perform operations comprising:
suggesting to a first user other users that first user may be interested in, wherein the suggested other users are filtered based on a location associated with each of the suggested other users;
causing a device to display one or more images of at least one other user;
causing the device to display a graphical user interface (GUI) for the first user to input a rating of the first user's level of interest in the at least one other user;
displaying, via the GUI, information about a second user that has rated the first user above a threshold level; and
electronically notifying both the first user and the second user that a match between the first user and the second user has occurred,
wherein the rating is whether the first user is either interested or uninterested in the at least one other user.

13. A computer-readable non-transitory physical storage medium having stored thereon machine-executable code for electronically facilitating contact between mutually interested entities, said machine-executable code to be executed by a microprocessor, said machine executable code which when executed by said microprocessor causes the microprocessor to perform operations comprising:
suggesting to a first user other users that first user may be interested in, wherein the suggested other users are filtered based on their respective locations;
causing a device to display a graphical user interface (GUI) for the first user to view one or more images of at least one other user and to indicate whether the first user is interested or uninterested in the at least one other user;
accepting, via the GUI, the first user's indication, while not displaying the first user's indication to the at least one other user;
displaying, via the GUI, information about a second user in the at least one other user that has indicated interest in the first user; and
electronically notifying both the first user and the second user that the first user and the second user have each indicated interest in each other.

* * * * *